(12) United States Patent
Clark

(10) Patent No.: US 9,217,661 B2
(45) Date of Patent: Dec. 22, 2015

(54) MULTI-HEAD WEIGHTING APPARATUS

(71) Applicant: ISHIDA EUROPE LIMITED, Birmingham, Westmidlands (GB)

(72) Inventor: Nickolas Martin Clark, Sedgley (GB)

(73) Assignee: Ishida Europe Limited, Birmingham (GB)

( * ) Notice: Subject to any disclaimer, the term of this patent is extended or adjusted under 35 U.S.C. 154(b) by 201 days.

(21) Appl. No.: 13/969,380

(22) Filed: Aug. 16, 2013

(65) Prior Publication Data

US 2014/0158438 A1 Jun. 12, 2014

(30) Foreign Application Priority Data

Aug. 23, 2012 (GB) .................................. 1215051.2

(51) Int. Cl.
  *G01G 19/387* (2006.01)
  *G01G 13/04* (2006.01)
  *G01G 19/393* (2006.01)

(52) U.S. Cl.
  CPC .............. *G01G 19/387* (2013.01); *G01G 13/04* (2013.01); *G01G 19/393* (2013.01)

(58) Field of Classification Search
  CPC ....... G01G 13/00; G01G 13/04; G01G 13/16; G01G 13/18; G01G 13/24; G01G 13/247; G01G 19/387; G01G 19/393
  USPC ...................................................... 177/25.18
  See application file for complete search history.

(56) References Cited

U.S. PATENT DOCUMENTS

| 4,446,937 | A | * | 5/1984 | Asai | 177/1 |
| 4,499,961 | A | * | 2/1985 | Fukuda | 177/25.18 |
| 4,508,186 | A | * | 4/1985 | Sashiki et al. | 177/25.18 |
| 4,511,010 | A | * | 4/1985 | Sashiki et al. | 177/1 |
| 4,529,049 | A | * | 7/1985 | Fukuda | 177/25.18 |
| 4,666,002 | A | * | 5/1987 | Haze | 177/1 |
| 4,676,326 | A | * | 6/1987 | Konishi | 177/1 |
| 5,048,623 | A | * | 9/1991 | Toyoda | 177/25.18 |
| 5,753,867 | A | * | 5/1998 | Konishi et al. | 177/25.18 |
| 7,790,990 | B2 | * | 9/2010 | Kieselhorst | 177/25.18 |
| 7,952,036 | B2 | * | 5/2011 | Kieselhorst | 177/25.18 |

* cited by examiner

Primary Examiner — Randy W Gibson
(74) Attorney, Agent, or Firm — Singularity LLP

(57) ABSTRACT

A multi-head weigher has a plurality of heads operable to hold and discharge product; first and second discharge chutes arranged to receive product discharged from respective first and second subsets of the plurality of heads and each operable to selectively deliver said product to a first location or a second location; and a combinational weight determining system operable to determine a combination of one or more heads which meets a target criterion, and to discharge product from the determined combination through their respective discharge chute(s) to the first location. When a predetermined condition has occurred, the combinational weight determining system can discharge product from that head(s) to the second location via the discharge chute arranged to receive product from that head(s), when said discharge chute is not being used to deliver product to the first location.

19 Claims, 7 Drawing Sheets

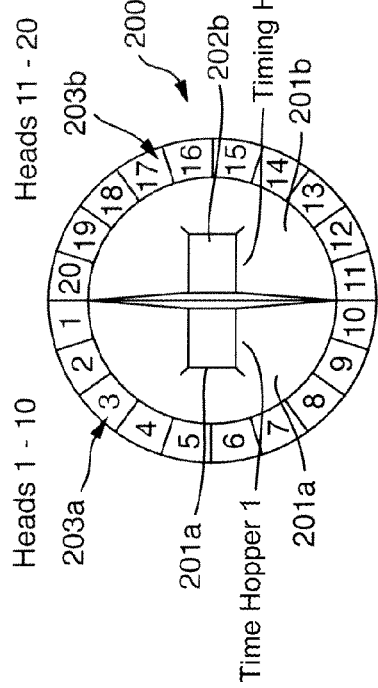
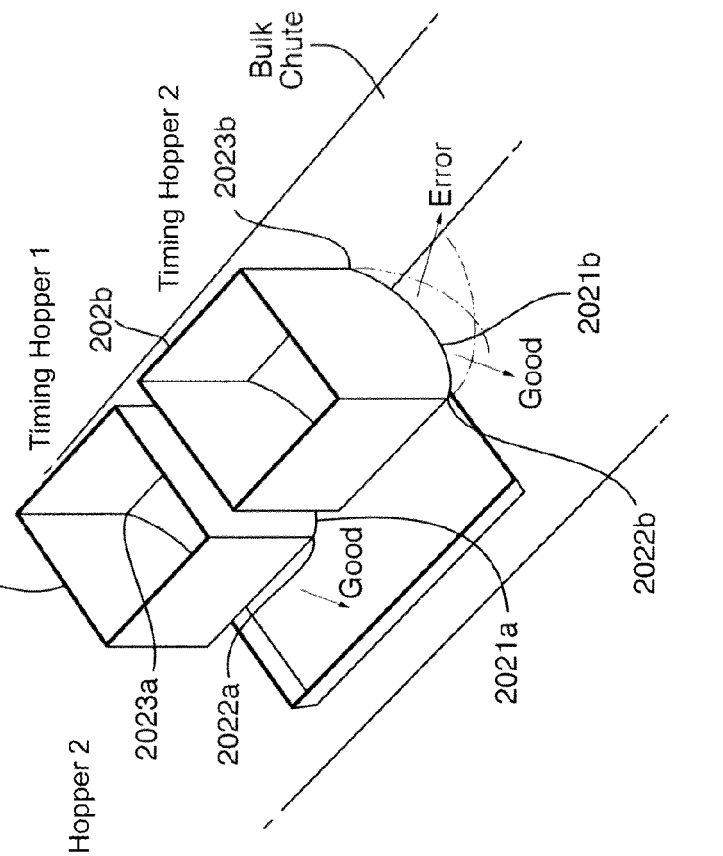
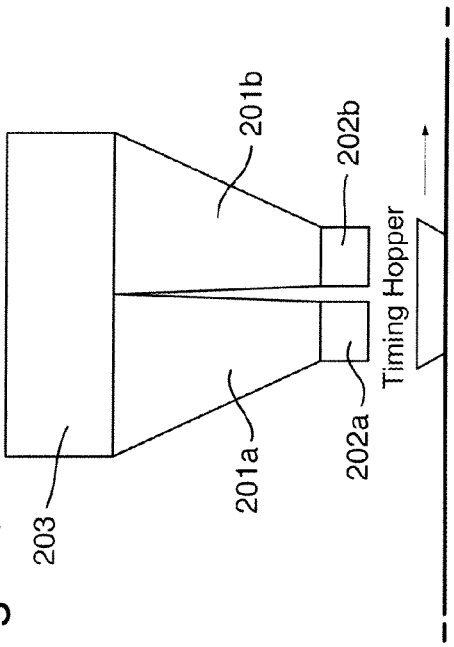
Fig. 2a
Fig. 2c
Fig. 2b

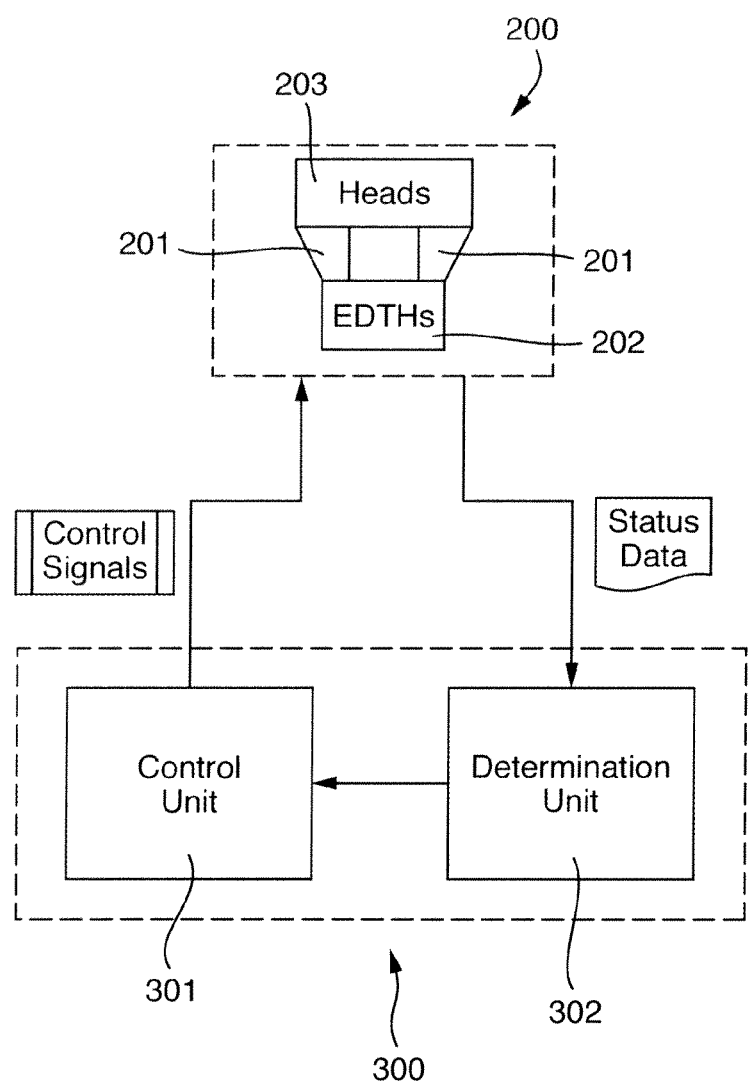

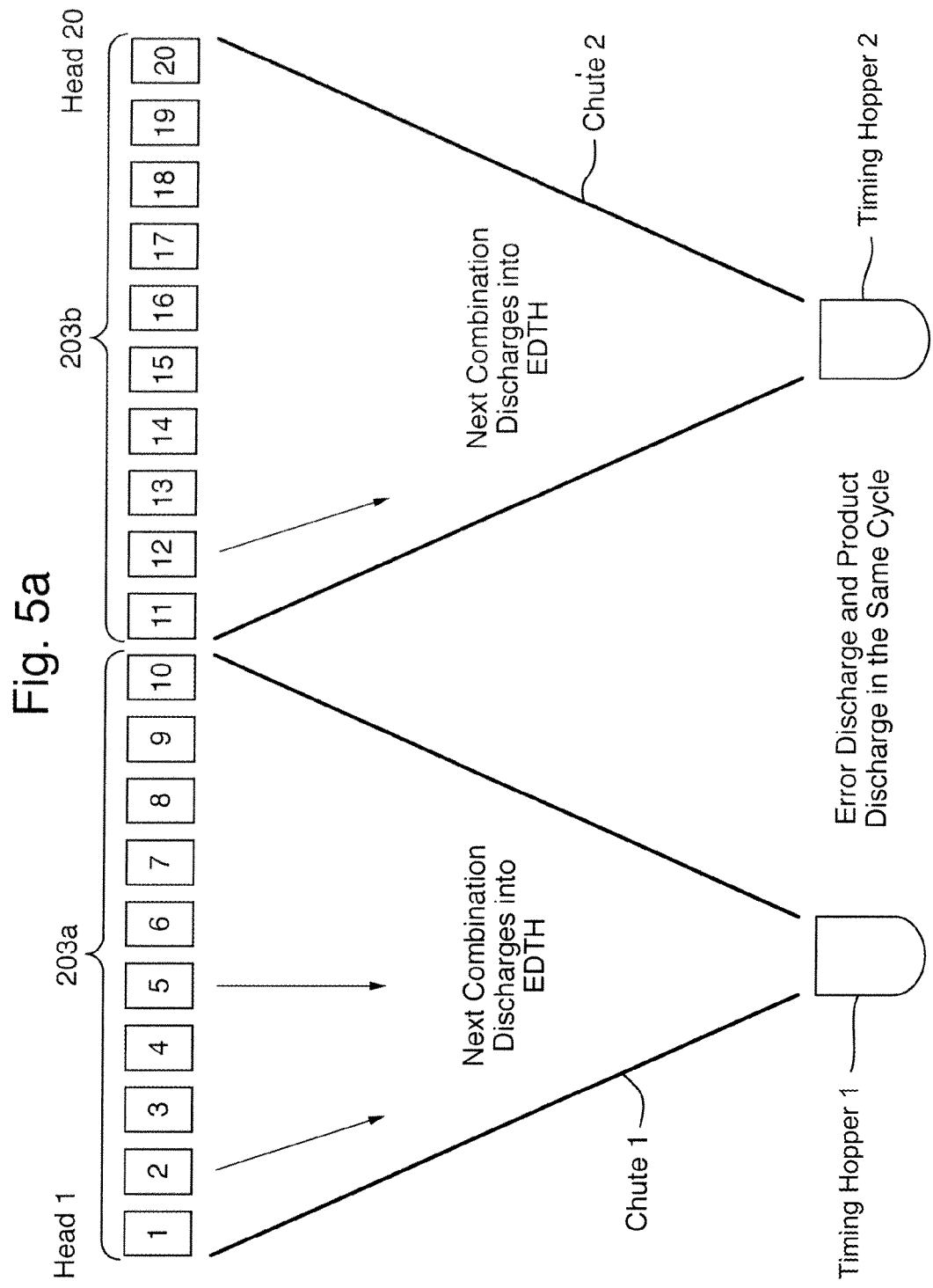

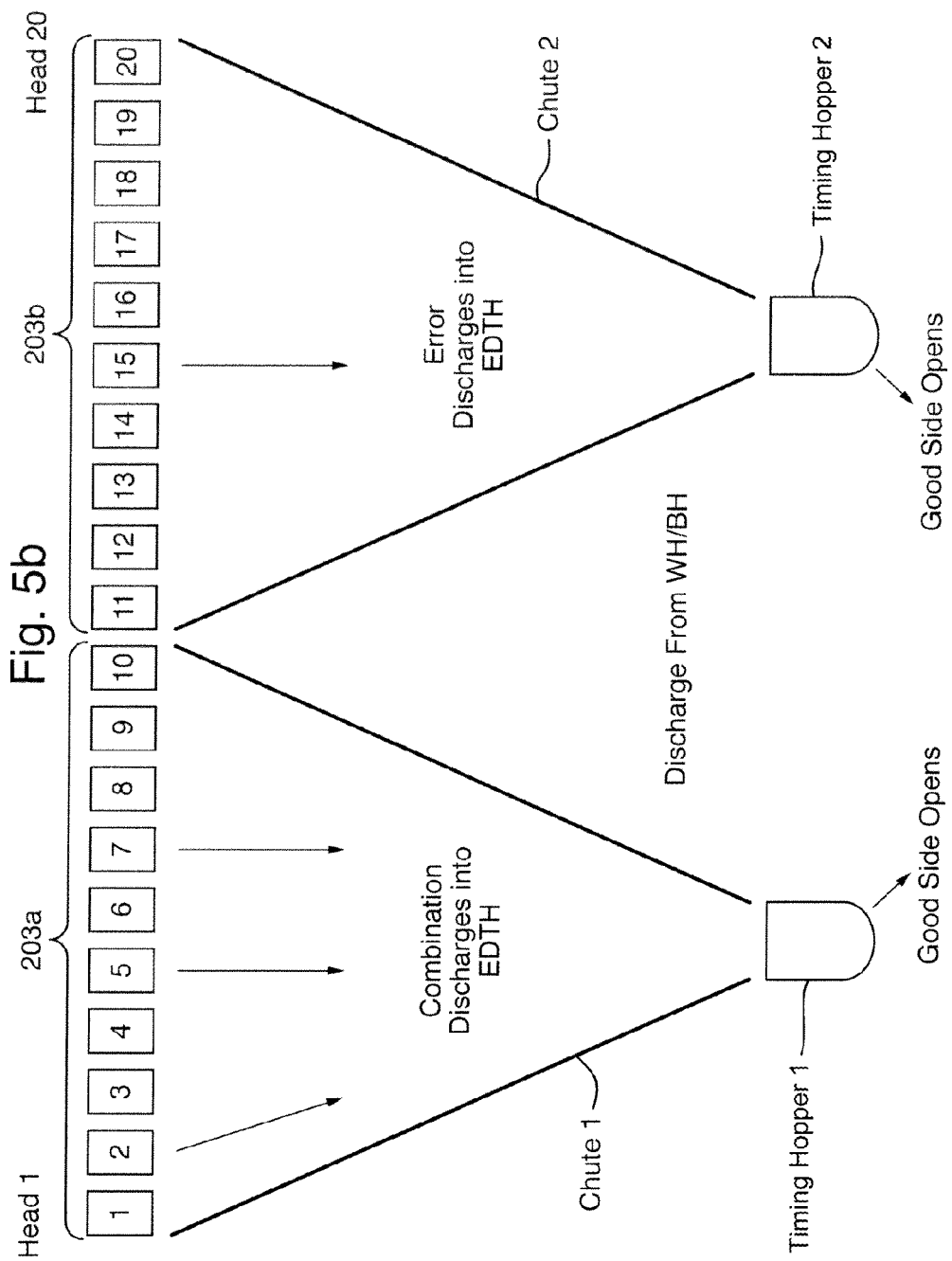

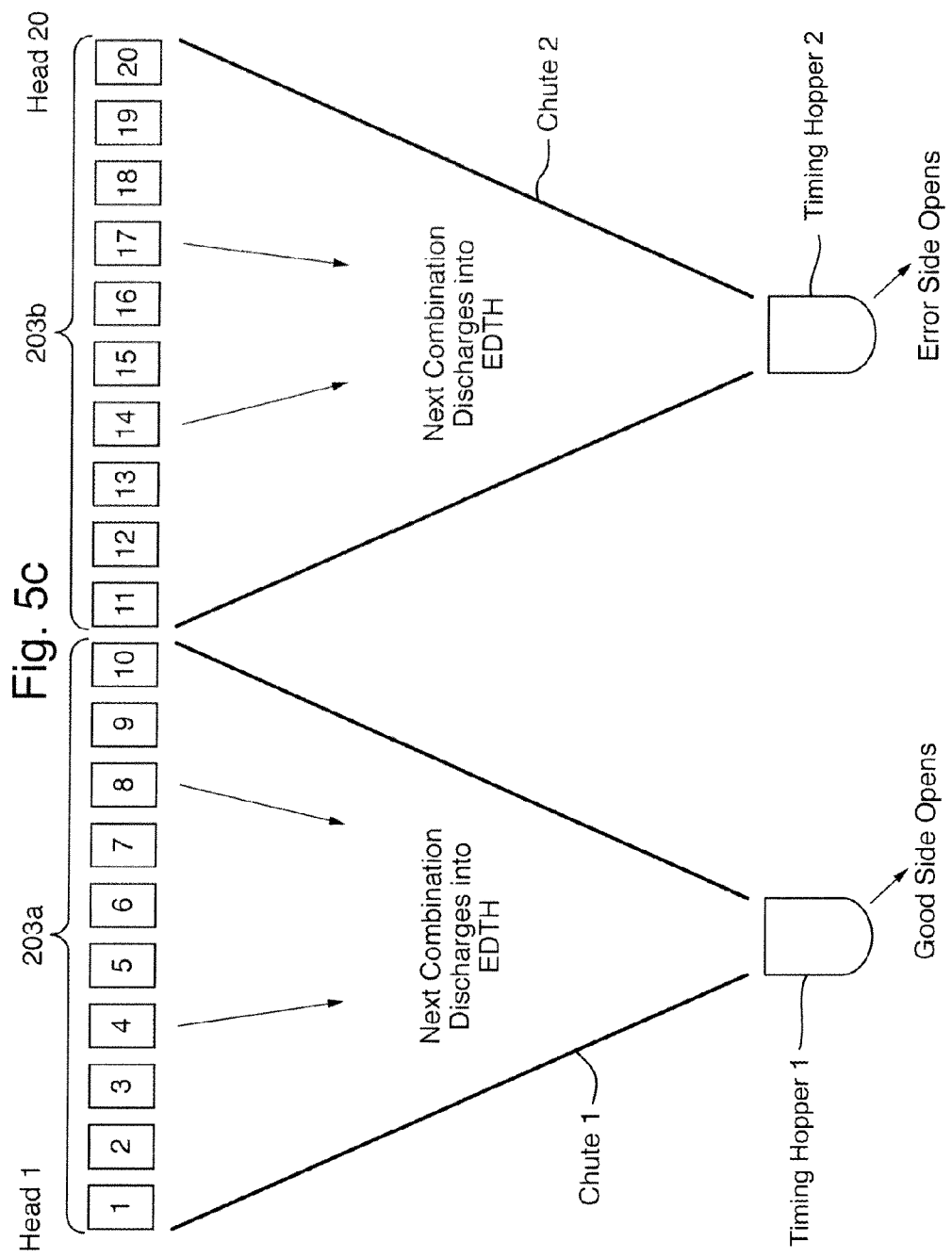

MULTI-HEAD WEIGHTING APPARATUS

FIELD OF THE INVENTION

This invention relates to weighing apparatus and in particular but not exclusively to a multi-head combination weighing apparatus and method for weighing batches of product.

DESCRIPTION OF THE RELATED ART

In manufacturing pre-packaged product it is important to have an efficient means of weighing and discharging product to containers in a packaging system. Sealed containers (e.g. trays) are produced where typically product comprised of portions which combine to make up a predetermined tray weight is deposited in each container. The trays are conveyed to a tray sealing unit where they are sealed ready for distribution. In order to deliver portions combining to form the target weight, weighing devices can be used having multiple weighing heads. Combinations of product from the multiple weighing heads are used to deliver product having a target weight or size. In operation, each of the weighing heads receives batches of product which are weighed in the head. A combination of weights held within the weighing heads is determined which matches a target criteria and product is discharged from those heads that are determined to make up the combination.

Combination weigher model CCW-R220W made by Ishida Europe Limited is an example of such a weighing device.

However, it is possible that product received in a weighing head can cause an error condition to occur in that head. For example, where the product received in that head exceeds a maximum weight or size. Typically, if an error condition is determined, an alarm sounds and the error product is manually removed by an operator. This is extremely inefficient and substantially reduces throughput. Alternatively, when an error condition is determined, the error product is discharged in that weighing cycle. When this occurs, a cycle of operation must be used to have the error product discharged to an error position. While the error product is discharged no combination can be made from the other heads and normal operation can only resume on the next cycle of operation.

As recognised by the inventors, weighing cycles lost in discharging error product leads to inefficiency in the weigher and the overall packaging system. It would, therefore, be desirable to have a weighing device which is more effective in dealing with errors as they occur.

SUMMARY OF INVENTION

According to a first aspect of the present invention there is provided a multi-head weigher comprising: a plurality of heads operable to hold and discharge product; first and second discharge chutes arranged to receive product discharged from respective first and second subsets of the plurality of heads and each operable to selectively deliver said product to a first location or a second location; a combinational weight determining system operable to determine a combination of one or more heads from the plurality of heads that hold product which in combination meets a target criterion, and to discharge product from the determined combination of one or more heads through their respective discharge chute(s) to the first location, and further wherein the combinational weight determining system is operable to determine when a predetermined condition has occurred in one of the plurality of heads, and the combinational weight determining system is further operable, if a predetermined condition has occurred, to discharge product from the head(s) in which the predetermined condition has occurred to the second location via the discharge chute arranged to receive product from that head(s), at a time when said discharge chute is not being used to deliver product to the first location.

During normal operation the weigher typically operates in "cycles", where product will be delivered to either or both of the first location or second location in each cycle. A combination meeting a target criterion can be made from product in any of the heads, and that combination of product is discharged to the first location via either or both discharge chutes (depending on the heads selected to make the combination). Once the combination has been delivered to the first location, another quantity of product is delivered to the heads in the multi-head weigher, thereby starting the next cycle. The product is typically discharged from the weigher at regular time intervals. Occasionally a combination of product cannot be made in a cycle, and no product is delivered to the first location in that cycle.

The multi-head weigher is typically used to weigh out batches of product (although it may also be used for continuous processes), for example batches of food product such as chicken breast for subsequent packing into trays to be sealed. In such a case, the first location may be a batching table, whereby an operator then packages the batch into a tray to be sealed. Alternatively, the first location may be a tray, in which case product is delivered directly into the tray, speeding up the packing process. The second location may be a bulk bin, whereby product that is not suitable for that particular batch (i.e. the predetermined condition is an "error" condition) is either re-used in another batch or sold cheaply. Alternatively, the second location could be a waste bin.

The heads may be weighing heads operable to determine the weight of product held in the respective head and said criterion comprises at least a target weight criterion. This allows certain weight batches, such as 1000 g of chicken leg or 800 g of chicken breast, to be weighed out. The batch delivered to the first location is typically made up of product from three or four of the heads.

Alternatively or in addition, the heads are operable to determine size information relating to product held in the respective head and said criterion comprises at least a target size criterion. Alternatively or in addition, the heads are operable to determine count information relating to product held in the respective head and said criterion comprises at least a count criterion. For example, the final batch comprising product from the heads may be four chicken thighs. Typically, the heads are operable to determine combinations using one of more of the above-described criteria.

The present invention comprises first and second discharge chutes arranged to receive product discharged from respective first and second subsets of the plurality of heads and each operable to selectively deliver said product to a first location or a second location. Each subset of heads contains less than all of the heads and preferably at least one of the subsets, most preferably each subset, comprises two or more heads. Furthermore, each head is preferably a member of one subset only, i.e. there is no 'overlap' between the subsets, and each head can discharge product to the chute dedicated to the relevant subset only. The feature of the first and second discharge chutes advantageously increases the flexibility of how a "predetermined condition" (for example an error) is dealt with by the multi-head weigher. As seen above, upon detection of a predetermined condition in one of the plurality of heads, product is discharged from the head(s) in which the predetermined condition occurred to the second location via the discharge chute arranged to receive product from that head(s), at a time when said discharge chute is not being used to deliver product to the first location.

This means that the discharge of predetermined condition product from the multi-head weigher is independent of the discharge of determined batches of product, and therefore the discharge of the predetermined condition product does not adversely affect the normal operation of the multi-head weigher. For example, the predetermined condition product may be discharged between cycles.

Preferably, the combinational weight determining system is further operable, if a predetermined condition has occurred, to determine a combination of one or more heads which in combination meets a target criterion, from the subset of heads in which the predetermined condition did not occur. If a combination of heads meeting the target criterion can be found in the subset of heads in which the predetermined condition did not occur, efficient use can be made of the first and second discharge chutes such that the predetermined condition product causes minimum disruption and downtime to the normal operation of the multi-head weigher.

Preferably, the combinational weight determining system is further operable, if a predetermined condition has occurred, to hold product in the head(s) in which the predetermined condition occurred until a combination of one or more heads which in combination meets a target criterion is determined from the subset of heads in which the predetermined condition did not occur. The product is held in that head while the weigher continues its normal mode of operation using the remaining heads to make up the target criteria combination. A weigher according to the present invention may typically comprise of 10 or more weighing heads, and so even if a head has a predetermined condition and the product in that head is held for a number of cycles, the probability of determining a combination meeting the target criterion from the remaining 9 remains acceptably high as typically three or four heads are used to make up the combination. Preferably still, the weigher comprises 10 or more weighing heads in each subset so that a high probability of determining a combination meeting the target criterion is maintained for each subset even after a predetermined condition has occurred for a head in that subset.

The combinational weight determining system may be operable to discharge product from the head(s) in which the predetermined error occurred in parallel with discharging product from the determined combination of one or more heads if said determined combination is from the subset of heads in which the predetermined condition did not occur.

Such "parallel discharging" means that the predetermined condition product and the determined combination are discharged to their respective locations in the same cycle. This arrangement advantageously allows the multi-head weigher to maintain normal operation even if a predetermined condition (such as an error) occurs. This results in higher weighing efficiency and optimisation of product weighing, as a weighing cycle does not have to be missed in order to discharge a product meeting a predetermined condition.

As explained above, "parallel discharging" means that the predetermined condition product and the determined combination are discharged in the same weigher cycle. Typically they are discharged simultaneously; however, they may be discharged at different times within the same cycle.

Preferably, if a predetermined condition has occurred, product from the head(s) in which the predetermined condition occurred is discharged through a different chute to discharged product from the determined combination of one or more heads. For example, the combination may be discharged to the first location (for example a batching table) via its respective chute while the predetermined condition product is discharged to the second location (for example a bulk bin) via its respective discharge chute.

If a predetermined condition occurs in more than one head, and a target combination is determined from among the subset of heads not including the heads in which the predetermined condition has occurred, then the product from the plurality of heads in which the predetermined condition has occurred may be discharged in parallel in the same manner as described above. Alternatively, if a predetermined condition has occurred in heads from different subsets, then the product in those heads may be discharged in parallel via their respective discharge chutes if the multi-head weigher is unable to make up a target combination (and would otherwise "miss" a cycle).

Preferably, the first and second discharge chutes comprise first and second timing hoppers respectively, said timing hoppers arranged to receive and hold product from the first and second discharge chutes, wherein each of said first and second timing hoppers are operable in a first mode to discharge product to the first location and in a second mode to discharge product to the second location, and said combinational weight determining system is further operable upon discharging product from the determined combination of heads to the first location, to select the first mode, and upon discharging product from the head(s) in which the predetermined condition occurred, to select the second mode.

The first and second timing hoppers provide an effective means of selectively discharging product received from the respective chutes to the first or second location. Also, by holding product in the hoppers, synchronisation of weighing cycles is facilitated.

Where timing hoppers are used, the first and second discharge chutes may be formed as a unitary member, thereby advantageously taking up less space in the multi-head weigher.

As an alternative to timing hoppers, the first and second discharge chutes may be moveably mounted such that exit ports of the chutes are moveable between the first location and the second location. If the chutes are arranged to be substantially vertical, this is particularly useful for sticky product (such as chicken) to prevent product sticking in the chutes.

The first and second timing hoppers may each further comprise a two-way hatch which is arranged so that in the first mode it opens in a first direction so that it guides discharged product to the first location and in the second mode opens in a second direction so that it guides discharged product to the second location. This provides a simple mechanical means to direct the product to the appropriate location. Such a two-way hatch is reliable and cheap to manufacture as a result of its mechanical simplicity. Alternatively however, the timing hoppers may have two separately operable doors, for example.

Typically, a predetermined condition has occurred in a head if the product in that head does not meet the target criteria for the batch being processed. In such a case, the predetermined condition is an "error" condition. However, the predetermined condition may be one or more different conditions. The predetermined condition may be a weight condition for example. This is a "positive" condition rather than the "negative" error condition where the predetermined condition occurs if the target criteria are not met. When the predetermined condition is a weight condition, the multi-head weigher may continue to weigh out batches of product (such as 500 g batches of chicken wings) as described above.

However, if a head detects product within a narrow weight range, then the product in that head can be discharged to the second location to be processed accordingly (such as packaged and distributed). This is particularly advantageous when producing orders for fast food restaurants for example, where tight weight tolerances are required. Thus, when product meeting a desired weight within tolerance is detected, that product may be separated from the batch product and discharged to the second location. In such a case the second location may be a further batching table or a tray or crate ready to be sealed and distributed.

Other examples of predetermined conditions include a count condition, where heads with a specific number of product portions may be discharged to the second location; a batching condition where the second location may be a crate to be filled with a specific weight, and a plurality of discharges to the second location may be performed to make up the desired crate weight; and a bulk condition, where the second location may be a bulk bin, and if the speed of product input to the weigher does not match the weigher working (cycle) speed, excess product may be discharged to the second location.

Preferably, the predetermined condition is at least one from the list of: an error condition, a count condition, a weight condition and a bulk condition. The predetermined condition may be a plurality of conditions, particularly in a case where the plurality of heads are split into three or more subsets, each with a respective discharge chute and location.

According to a second aspect of the present invention there is provided a method of operating a multi-head weigher, said multi-head weigher having a plurality of heads operable to hold and discharge product, first and second discharge chutes arranged to receive product discharged from respective first and second subsets of the plurality of heads and each operable to selectively deliver said product to a first location or a second location, said method comprising: (a) determining a combination of one or more heads from the plurality of heads that hold product which in combination meets a target criterion; (b) discharging product from the determined combination of one or more heads through their respective discharge chute(s) to the first location; (c) determining when a predetermined condition has occurred in one of the plurality of heads, and (d) upon determination that a predetermined condition has occurred in one of the plurality of heads, discharging product from the head(s) in which the predetermined condition has occurred to the second location via the discharge chute arranged to receive product from that head(s), at a time when said discharge chute is not being used to deliver product to the first location.

The method may further comprise the step of; upon determination that a predetermined condition has occurred in one of the plurality of heads, holding product in the head(s) in which the predetermined condition occurred until a combination of one or more heads which in combination meets a target criterion is determined from the subset of heads in which the predetermined condition did nor occur.

The method may further comprise the step of; upon determination that a predetermined condition has occurred in one of the plurality of heads, discharging product from the head(s) in which the predetermined error occurred in parallel with discharging product from the determined combination of one or more heads if said determined combination is from the subset of heads in which the predetermined condition did not occur.

The method may further comprise the step of; upon determination that a predetermined condition has occurred in one of the plurality of heads, discharging product from the head(s) in which the predetermined condition occurred through a different chute to that used to discharge product from the determined combination of one or more heads.

According to a third aspect of the present invention there is provided a machine readable medium comprising executable instructions than when executed by a machine cause the machine to become operable to perform the method of the second aspect.

BRIEF DESCRIPTION OF DRAWINGS

Embodiments will now described with reference to the accompanying drawings in which:

FIGS. 2a and 2b show schematic views of an example of a combination weigher according to the present invention from overhead and side profiles;

FIG. 2c shows a perspective view of electronic timing hoppers arranged at the base of each chute of the combination weigher;

FIG. 3 is a block diagram showing the functional components that comprise the combination weigher of FIGS. 2a and 2b;

FIGS. 5a to 5c show an example of how the combination weigher would operate when an error is detected in one of its weighing heads.

DESCRIPTION OF EMBODIMENTS

The following description relates to the case where the "predetermined condition" is an error condition. The first location is referred to as a good location, and the second location is referred to as an error location. However, as has been discussed, the predetermined condition may be different to an error condition.

Figure 1A:
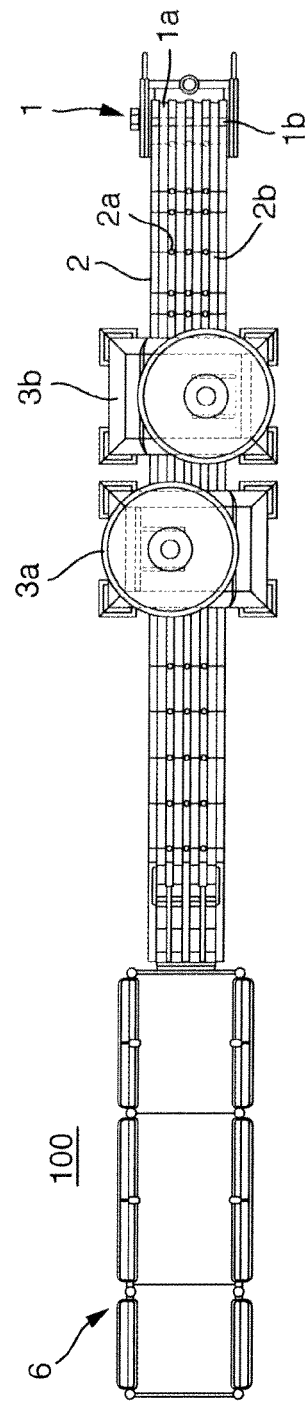
FIG. 1a shows a top-down schematic and FIG. 1b is a side elevation of a twin lane production line having multi-head weighers arranged to deliver product.
Figure 1B:
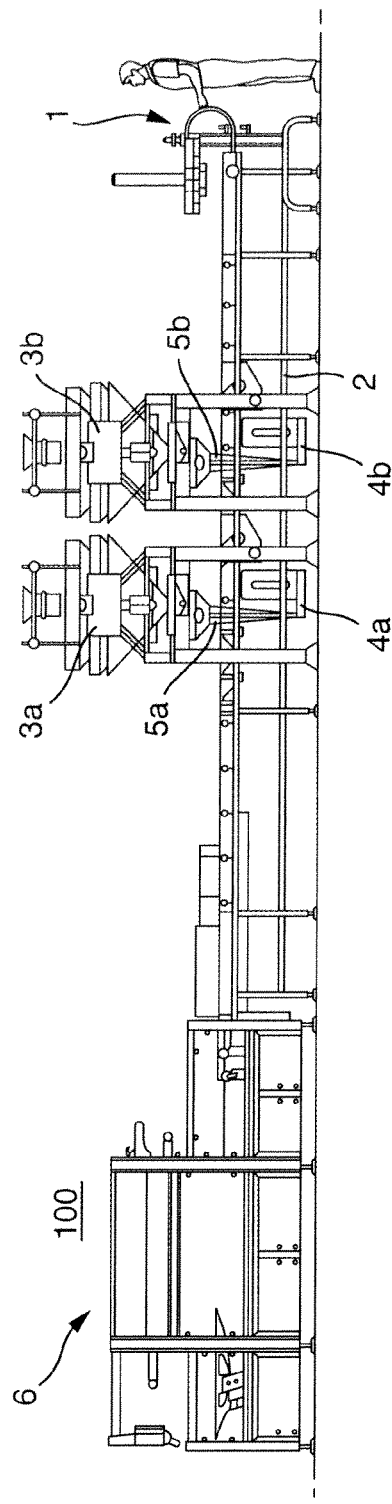

An example of a typical application for the combination weigher of the present invention is illustrated in FIGS. 1a and 1b, which shows a food packaging system 100 comprising a twin tray de-nester 1 and a twin lane conveyor 2 comprising parallel conveyors 2a,2b. Two computer combination weighers (CCWs) 3a and 3b and a tray sealer 6 are positioned along the transport path. The CCWs 3a and 3b are operable to weigh and distribute product and the tray sealer is operable to seal the trays conveyed along the transport path.

The food packaging system 100 has two lanes along which trays can be conveyed, filled and sealed. The trays are typically supplied in nests and sit within respective tray cassettes of the twin tray de-nester 1. The tray de-nester used is a scroll de-nester in order to minimize contact with the surface of the trays but it will be appreciated that other conventional de-nesters known in the art could alternatively be used. The trays are extracted from the first and second tray cassettes 1a and 1b of the de-nester and supplied on the conveyors 2a and 2b at regular intervals. The extracted trays are equally spaced from each other along the conveyors 2a and 2b. The twin tray de-nester 1 holds trays in first and second tray cassettes said trays in the first and second cassettes having equal or different dimensions respectively.

The trays deposited by the de-nester 1 are transported towards the respective CCWs 3a and 3b by the conveyors 2a,2b of the twin lane conveyor 2. The lanes of the conveyor 2 pass under the respective CCWs 3a and 3b. Each CCW 3a, 3b is configured to weigh and discharge a predetermined batch of product. The target properties of the batch typically relate to weight and/or size and/or count and are selected to correspond to the dimensions of the tray into which the product is to be deposited. Beneath the CCWs 3a and 3b there are positioned respective reciprocating distribution systems 4a and 4b. Each distribution system is positioned beneath a corresponding CCW 3a, 3b and arranged such that product delivered from the CCW 3a, 3b is received into a delivery head 5a, 5b of the distribution system. The distribution system is operable to oscillate the position of the head 5a, 5b above a passing tray in a reciprocal manner such that the product is evenly distributed across the tray. In this manner, every passing tray on the twin lanes is evenly filled with a quantity of product corresponding to the tray size being used in the respective lane.

After passing under the CCWs 3a and 3b the filled trays are transported towards the tray sealer 6 for sealing and distribution.

In a production line as shown in FIG. 1, the efficiency of the CCWs is critical. Any delay in depositing product from a CCW due to an error in one of its weighing heads can lead to a reduction in throughput.

An example of a single CCW according to the present invention is shown in FIGS. 2a and 2b. As shown, the CCW 200 comprises first and second chutes 201a and 201b. Above the first and second chutes 201a and 201b are arranged first and second groups (i.e. subsets) of weighing heads 203a and 203b. In this embodiment the first group of heads 203a comprises heads 1-10 and the second group of heads 203b comprises heads 11-20. Thus, each group comprises ten weighing heads arranged so that product discharged from the heads in the first and second group 203a and 203b are delivered to the respective chute 201a and 201b below. However, it is to be understood that a greater or fewer number of heads is possible and moreover in some embodiments the first and second group 203a and 203b may not have an equal number of weighing heads. In general each group or 'subset' of heads contains less than all of the heads and preferably at least one of the subsets, most preferably each subset, comprises two or more heads.

Arranged at the exit points of the first and second chutes 201a and 201b are respective first and second error diverting timing hoppers (EDTHs) 202a and 202b. Product discharged into the first chute 201a from the first group of weighing heads 203a is delivered to the first EDTH 202a. Similarly, product into the second chute 201b from the second group of weighing heads 203b is delivered to the second EDTH 202b. As will be described in more detail below in normal operation, a combination of product held in the heads 1-20 is determined which combine to make a target criteria (e.g. a target weight or count). The heads containing the components of that combination are discharged into their respective chutes and delivered to the EDTHs 202a, 202b. Upon the next cycle of operation the contents of the EDTHs 202a, 202b are discharged to an outlet.

The structure of the EDTHs 202a and 202b is shown in FIG. 2c. Each comprises a hopper having a two way hatch 2021a and 2021b which is releasable about first pivot point 2022a, 2022b and second pivot point 2023a, 2023b such that product can be guided towards either of two outlets upon discharge. Each two way hatch of EDTH 202a and 202b is preferably electronically controllable to be in one of three positions. A closed position in which the hatch is closed and product is held in the hopper, a first open position in which the hatch is released at the first pivot point and swings open downwardly in a clockwise motion, and a second open position in which the hatch is released at the second pivot point and swings open downwardly in an anti-clockwise motion. The hopper can be actuated from the first and second open positions to return to the closed position.

Accordingly, in the first open position product is guided out of the hopper is a first direction and in the second open position guided in a different direction. The opening positions are configured so that in the first position discharged product is guided towards a good location and when in the second position discharged towards an error location.

Thus, each EDTH 202a and 202b provides means for selectively discharging product held therein to either of two paths leading to a good product outlet and an error product outlet respectively.

The good location may, for example, be a batching table or a tray to be filled on a conveyor in a packaging system, while the error location may be a bulk product or waste container.

A block diagram showing the functional components which co-operate together to control the combination weigher is shown in FIG. 3. The weigher 200 having the heads 203a, 203b and EDTHs 202a, 202b is connected to a combinational weight determining system 300 (CWDS). The CWDS 300 comprises control unit 301 and a determination unit 302. The determination unit 302 is configured to receive electronic signals from the weigher 200 and in particular weighing data from the weighing heads 203a, 203b and to perform determinations based on that received data. Specifically, to determine whether 1-5 any error has occurred with the weighing heads 203a, 203b and whether any suitable combination exists that meets the target criteria. The control unit 301 is operative to receive the results of the determinations made by the determination unit 302 and send and receive control signals to/from the weighing heads 203a, 203b and EDTHs 202a, 202b of the weigher 200. Preferably, the control unit also comprises a memory to store status data relating to the EDTHs 202a, 202b and what they contain (i.e. error product or product comprising all or part of a valid combination).

Although the CWDS 300 and the weigher 200 are shown as separate functional units in FIG. 3, it is to be understood that the CWDS could be included as part of the weigher 200 itself or separately as components in a distributed system. For example, the control unit 301 and the determination unit 302 within the CWDS could comprise hardware components or software modules running on a computer in communication with the weigher. Further their functions could be combined so that the determination processes and the generation of control signals are performed by a single functional component.

Figure 4:
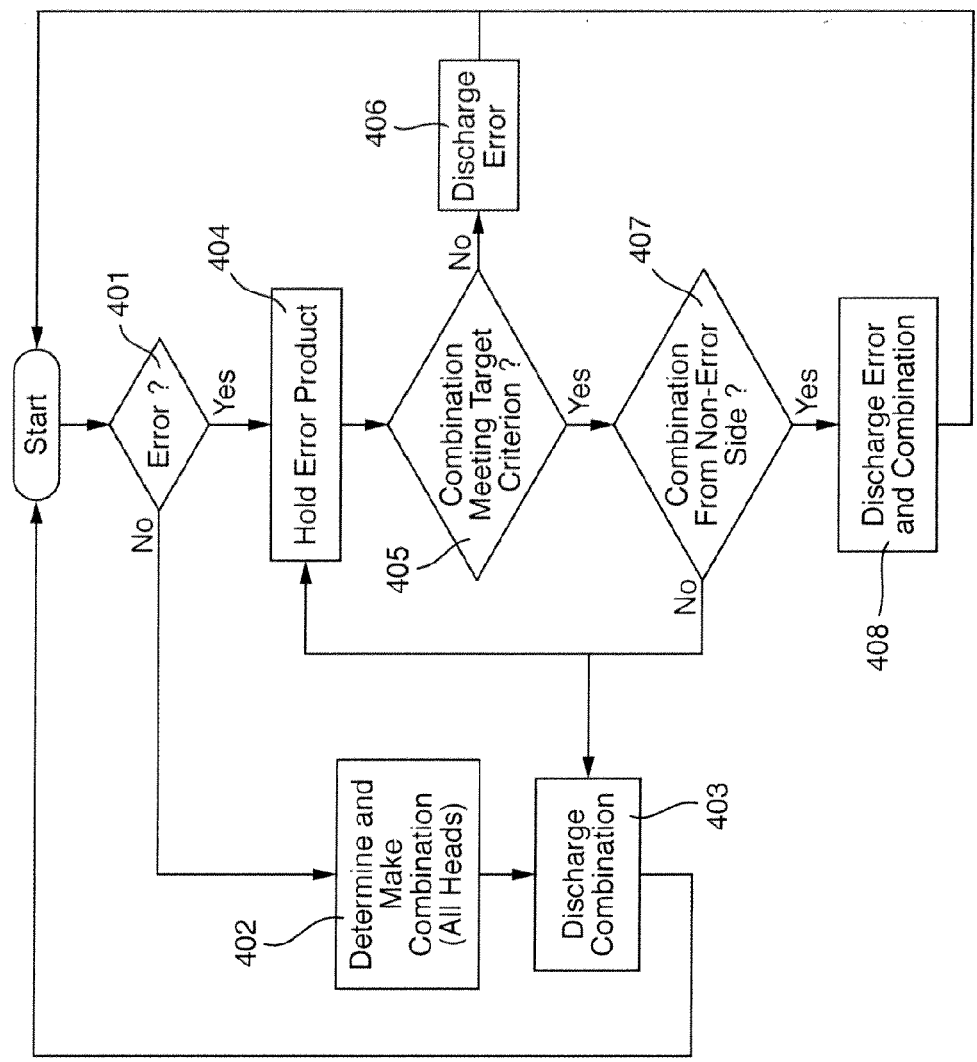
FIG. 4 is a flow chart setting out the process steps performed by the combination weigher.

Operation of the weigher apparatus of FIG. 3 will now be described with reference to the process flow chart shown of FIG. 4. At step 401 the determination unit 302 receives weight data from the weighing heads 203a and 203b of the weigher 200 and determines from that data whether a weighing error has occurred in any of the heads. For example, if the weight of product in one of the weighing heads 203a, 203b falls outside a predetermined range of weights or a predetermined count is not met then this may indicate an error has occurred.

If no error is detected then processing continues at step 402 where the determination unit determines whether a combination can been made from the product held in the weighing heads 203a, 203b which meets the target weight criteria. Once a combination has been found the determination unit passes data specifying the combination of heads to the control unit 301. The control unit 301 at step 403 then sends suitable control signals to the weigher 200 that initiate the next discharge cycle of the weigher 200. The control signals contain instructions for the weigher 200 to discharge the previous contents of the EDTHs 202a, 202b and to discharge the heads determined to make up the combination to their respective chutes. The content of an EDTH 202a, 202b is discharged to the good location where the product received from the weighing heads 203a, 203b in the previous cycle did not include error product. In contrast, where one of the EDTHs 202a, 202b contains error product received in the previous cycle, the control unit 301 remembers this in memory and knows to instruct the relevant EDTH to discharge to the error side. After discharging, the EDTHs 202a, 202b are returned to their holding position by the control unit. The control unit then instructs the weighing heads 203a, 203b making up the combination to discharge into their respective chutes. The EDTHs 202a, 202b receive product from those chutes. The combination of product weights held in the two EDTHs 202a, 202b combine to make up the target weight. Thus, upon the next discharge cycle both EDTHs 202a, 202b will be discharged upon instruction from the control unit 301 to the good location.

Processing then returns to step 401 where a fresh determination is made as to whether any error has occurred in the weighing heads 203a, 203b. Provided no error has occurred the weigher 200 will continue to make combinations and discharge product from the EDTHs 202a, 202b to the good outlet by repeating steps 402 and 403.

However, when an error occurs, processing then branches to step 404. The determination unit 302 knows that an error has occurred and in which head the error product lies. At step 404 the control unit ensures that the error product is held in its respective weighing head. At step 405, the determination unit 302 determines if a combination can be made from any of the heads (either from group 203a or 203b) which does not include the head in which the error has taken place. If no suitable combination can be made at that time then the error (or errors) is discharged at step 406 and the process returns to step 401. This ensures that no cycles are "wasted". Even so, in alternative embodiments, if no combination can be made the process returns to step 404 and the error continues to be held. Discharging the error product frees up all of the heads and so the chances of a combination being made in the next cycle increases. Once a combination is determined from the remainder of available weighing heads 203a, 203b then processing continues at step 407.

At step 407 the determination unit 302 determines whether the combination can be made solely from the group of heads which does not include the head in which the error has occurred. If this is not the case (for example if the combination is made up of product in two heads in group 203a and one head 203b), then the error product continues to be held, whilst the combination is discharged (step 403) from the weighing heads into the EDTHs 202a, 202b via the respective chutes.

However, if a combination meeting the target criterion can be made up from heads in the group of heads in which the error did not occur (for example if the error is in group 203a whereas the combination can be made up solely from group 203b), processing continues to step 408. Here, the EDTHs 202a, 202b are discharged upon instruction from the control unit 301 to the appropriate good or error locations depending on whether the control unit recalls from its memory that they contain error product or product making up at least part of a valid combination respectively. The EDTHs 202a, 202b are returned to the holding position and then the head with the error product is discharged via its respective chute into the corresponding EDTH and the heads from the other group making up the combination are discharged via their chute into the other EDTH. At this stage one EDTH contains product making up a valid combination of product weights and the other EDTH contains error product. Thus, upon the next discharge cycle the EDTH with the error product will be discharged to the error location and the EDTH with the valid combination will be discharged to the good location. The probability of rapidly finding a combination from the other group of heads depends on at least the number of heads in each group and the target weight. For example, in some implementations there is a 1 in 2 chance of making up the combination by selecting two heads from the same group and a 1 in 4 chance of making it up from three heads. Accordingly, with those probabilities the likelihood of making a combination within a small number of cycles is high.

An example of the operation of the weigher 200 will now be described with reference to FIGS. 5a to 5c. In this example, the weigher 200 has two sides 203a, 203b each having a group of ten weighing heads 1-10 and 11-20.

In FIG. 5a, a scenario is shown whereby a weighing error has been detected in head 15. All of the remaining heads 1 to 14 and 16 to 20 from both sides 203a, 203b are available to make a combination. As illustrated, heads 2, 5 and 12 are determined to combine to meet the target weight criterion. The selected heads 2 and 5 are discharged into chute 1 and selected head 12 is discharged into chute 2 whilst the error is held in head 15. EDTH 1 and EDTH 2 are initially empty and therefore remain in their hold state to receive product from heads 2, 5 and 12. At the end of this cycle, therefore, EDTH 1 and EDTH 2 together contain product that in combination makes up a target weight criterion.

FIG. 5b shows the next cycle of operation. In this cycle, the error in head 15 is still held, but no further errors are detected. Therefore, as in the previous cycle, the remaining heads 1 to 14 and 16 to 20 are available to make a combination. In this cycle, heads 2, 5 and 7 are available to combine to meet a target weight criterion. As can be seen in FIG. 5b, the heads 2, 5 and 7 are all contained within the group of heads 203a, whereas the error head is contained within head 203b. EDTH 1 and EDTH 2 are both opened to their good sides, as in the previous cycle they both held product to combine to make up the target weight criterion. As schematically shown in FIG. 5b, the good sides of EDTH 1 and EDTH 2 open facing each other. This ensures that the product from both EDTHs combines at a single location (e.g. dispensed to a tray on a conveyor positioned between the EDTHs). EDTH 1 and EDTH 2 are then returned to their closed positions ready to receive product from chute 1 and chute 2 respectively.

Weighing heads 2, 5 and 7 are then discharged into chute 1 to EDTH 1 and weighing head 15 is discharged into chute 2 to EDTH 2. At the end of this cycle, EDTH 1 contains the product from heads 2, 5 and 7 while EDTH 2 contains the error product from head 15. The product held in EDTH 1 in combination makes up the target weight.

In the next cycle shown in FIG. 5c, as no further error is detected, a new combination is determined from weighing heads 4, 8, 14 and 17. EDTH 1 is discharged to the good location and EDTH 2 is discharged to the error location (e.g. to bulk). Weighing heads 4, 8, 14 and 17 are discharged into their respective chutes to EDTH 1 and EDTH 2. At the end of this cycle, EDTH 1 contains the product from heads 4 and 8, while EDTH 2 contains the product from heads 14 and 17. The product held in EDTH 1 and EDTH 2 in combination makes up the target weight.

Processing would continue in this manner while the weighing heads are refreshed with fresh product between cycles. If further errors are detected they are dealt with in the manner of FIGS. 5a to 5c and there is no need to lose a cycle to discharge the error product. This makes the weigher 200 particularly efficient and allows increased throughput in a production line or factory system.

Although in this example, the good combinations are made up from three or four weighing heads, it is to be understood that the target weight could be met from any number of available heads. Alternatively, in order to moderate the processing of the determination unit, the number of heads from which a combination can be made could be limited by setting a minimum and/or maximum number of heads from which a combination is to be made.

Similarly, the weigher is capable of dealing with a situation when more than one error is determined. If both groups of heads 203a, 203b contain an error simultaneously, then the heads containing the errors are dispensed with at the same time through their respective EDTHs.

As will be appreciated by those skilled in the art, the control unit and determination unit may be implemented in any suitable combination of hardware and software which process electronic signals to communicate with the components of the combination weigher to perform the processes described herein. Further, the control and determination unit may comprise programmable apparatus which upon executing computer executable instructions become operable to co-operate with the combination weigher to perform those processes.

In the above embodiments, the heads of the combination weigher are described as weighing heads 203a, 203b and a determination is made as to a suitable combination of weights to meet a target weight and where there is a weighing error. However, in other embodiments the heads may be configured to determine other characteristics of the product held therein and the combination is to meet a target criteria based on those characteristics and the error is an error determined based on those characteristics. For example, the target criteria may be the size of product and an error may be related to product having a size outside acceptable bounds. As a further example the target criteria may be the count of product and an error may be related to having a count outside of acceptable limits. Alternatively, a combination of criteria could be required to meet the target or determine errors, for example a combination of size and weight criteria.

As described in the summary of invention section, referring to FIGS. 5a and 5b, the predetermined condition seen in head 15 could be a desired product weight (for example suitable for a fast food restaurant) instead of an error. In such a scenario, the product in head 15 is separated from the combination in the same way as described with reference to FIGS. 5a to 5c. Other predetermined conditions are also envisaged.

Although the above embodiment uses an EDTH having a two-way hatch or flap, other means could be used to selectively discharge product to the good or error location. For example, the chutes 201a, 201b may be moveably mounted such that their exits ports move between the good and error locations.

Although the above described embodiments describe a split weigher having first and second groups of heads, chutes and hoppers, in further embodiments more than two groups of heads, chutes and hoppers could be used. For example the weighing heads in the weigher could be split into three or more groups of heads, with each group having its own respective chute and EDTH. Splitting the whole plurality of heads into three or more groups increases the probability that, if an error is detected, a combination meeting the target criteria can be made up from heads not in the group containing the error head, allowing the combination and error to be discharged simultaneously.

I claim:

1. A multi-head weigher comprising:
   a plurality of heads operable to hold and discharge product;
   first and second discharge chutes arranged to receive product discharged from respective first and second subsets of the plurality of heads and each operable to selectively deliver said product to a first location or a second location;
   a combinational weight determining system operable to determine a combination of one or more heads from the plurality of heads that hold product which in combination meets a target criterion, and to discharge product from the determined combination of one or more heads through their respective discharge chute(s) to the first location, and further wherein:
   the combinational weight determining system is operable to determine when a predetermined condition has occurred in one of the plurality of heads,
   the combinational weight determining system is further operable, if a predetermined condition has occurred, to discharge product from the head(s) in which the predetermined condition has occurred to the second location via the discharge chute arranged to receive product from that head(s), at a time when said discharge chute is not being used to deliver product to the first location;
   wherein the first and second discharge chutes comprise first and second timing hoppers respectively, said timing hoppers arranged to receive and hold product supplied to the first and second discharge chutes,
   wherein each of said first and second timing hoppers is operable in a first mode to discharge product to the first location and in a second mode to discharge product to the second location, and
   said combinational weight determining system is further operable upon discharging product from the determined combination of heads to the first location, to select the first mode, and upon discharging product from the head(s) in which the predetermined condition occurred, to select the second mode.

2. A multi-head weigher according to claim 1, wherein the combinational weight determining system is further operable, if a predetermined condition has occurred, to determine a combination of one or more heads which in combination meets a target criterion, from the subset of heads in which the predetermined condition did not occur.

3. A multi-head weigher according to claim 1, wherein the combinational weight determining system is further operable, if a predetermined condition has occurred, to hold product in the head(s) in which the predetermined condition occurred until a combination of one or more heads which in combination meets a target criterion is determined from the subset of heads in which the predetermined condition did not occur.

4. A multi-head weigher according to claim 1, wherein the combinational weight determining system is operable, if a predetermined condition has occurred, to discharge product from the head(s) in which the predetermined condition occurred in parallel with discharging product from the determined combination of one or more heads.

5. A multi-head weigher according to claim 1, wherein, if a predetermined condition has occurred, product from the head(s) in which the predetermined condition occurred is discharged through a different chute to discharged product from the determined combination of one or more heads.

6. A multi-head weigher according to claim 1, wherein said first and second timing hoppers each comprise a two-way hatch which is arranged so that in the first mode it opens in a first direction that guides discharged product to the first location and in the second mode opens in a second direction that guides discharged product to the second location.

7. A multi-head weigher according to claim 1, wherein said heads are weighing heads operable to determine the weight of product held in the respective head and said target criterion comprises at least a target weight criterion.

8. A multi-head weigher according to claim 1, wherein said heads are operable to determine size information relating to product held in the respective head and said target criterion comprises at least a target size criterion.

9. A multi-head weigher according to claim 1, wherein said heads are operable to determine count information relating to product held in the respective head and said target criterion comprises at least a count criterion.

10. A multi-head weigher according to claim 1, wherein the predetermined condition is at least one from the list of: an error condition, a count condition, a weight condition and a bulk condition.

11. A multi-head weigher according to claim 1, wherein the predetermined condition is an error condition and occurs in a head if the product in that head, in combination with at least one other head, does not meet the target criterion.

12. A multi-head weigher according to claim 1, wherein the first location is a batching table.

13. A multi-head weigher according to claim 1, wherein the second location is a bulk bin.

14. A method of operating a multi-head weigher, said multi-head weigher having a plurality of heads operable to hold and discharge product, first and second discharge chutes arranged to receive product discharged from respective first and second subsets of the plurality of heads and each operable to selectively deliver said product to a first location or a second location, said method comprising:
(a) determining a combination of one or more heads from the plurality of heads that hold product which in combination meets a target criterion;
(b) discharging product from the determined combination of one or more heads through their respective discharge chute(s) to the first location;
(c) determining when a predetermined condition has occurred in one of the plurality of heads, and
(d) upon determination that a predetermined condition has occurred in one of the plurality of heads, discharging product from the head(s) in which the predetermined condition has occurred to the second location via the discharge chute arranged to receive product from that head(s), at a time when said discharge chute is not being used to deliver product to the first location;
wherein the first and second discharge chutes comprise first and second timing hoppers respectively, said timing hoppers arranged to receive and hold product supplied to the first and second discharge chutes,
wherein each of said first and second timing hoppers is operable in a first mode to discharge product to the first location and in a second mode to discharge product to the second location, and
said combinational weight determining system is further operable upon discharging product from the determined combination of heads to the first location, to select the first mode, and upon discharging product from the head(s) in which the predetermined condition occurred, to select the second mode.

15. A method according to claim 14, further comprising the step of;
upon determination that a predetermined condition has occurred in one of the plurality of heads, determining a combination of one or more heads which in combination meets a target criterion, from the subset of heads in which the predetermined condition did not occur.

16. A method according to claim 14, further comprising the step of;
upon determination that a predetermined condition has occurred in one of the plurality of heads, holding product in the head(s) in which the predetermined condition occurred until a combination of one or more heads which in combination meets a target criterion is determined from the subset of heads in which the predetermined condition did not occur.

17. A method according to claim 14, further comprising the step of;
upon determination that a predetermined condition has occurred in one of the plurality of heads, discharging product from the head(s) in which the predetermined error occurred in parallel with discharging product from the determined combination of one or more heads if said determined combination is from the subset of heads in which the predetermined condition did not occur.

18. A method according to claim 14, further comprising the step of;
upon determination that a predetermined condition has occurred in one of the plurality of heads, discharging product from the head(s) in which the predetermined condition occurred through a different chute to that used to discharge product from the determined combination of one or more heads.

19. A non-transitory machine readable medium comprising executable instructions that when executed by a machine control operation of a multi-head weigher having a plurality of heads operable to hold and discharge product, first and second discharge chutes arranged to receive product discharged from respective first and second subsets of the plurality of heads and each operable to selectively deliver said product to a first location or a second location, said method comprising:
(a) determining a combination of one or more heads from the plurality of heads that hold product which in combination meets a target criterion;
(b) discharging product from the determined combination of one or more heads through their respective discharge chute(s) to the first location;
(c) determining when a predetermined condition has occurred in one of the plurality of heads, and
(d) upon determination that a predetermined condition has occurred in one of the plurality of heads, discharging product from the head(s) in which the predetermined condition has occurred to the second location via the discharge chute arranged to receive product from that head(s), at a time when said discharge chute is not being used to deliver product to the first location;
wherein the first and second discharge chutes comprise first and second timing hoppers respectively, said timing hoppers arranged to receive and hold product supplied to the first and second discharge chutes,
wherein each of said first and second timing hoppers is operable in a first mode to discharge product to the first location and in a second mode to discharge product to the second location, and
said combinational weight determining system is further operable upon discharging product from the determined combination of heads to the first location, to select the first mode, and upon discharging product from the head(s) in which the predetermined condition occurred, to select the second mode.

* * * * *

UNITED STATES PATENT AND TRADEMARK OFFICE
CERTIFICATE OF CORRECTION

| | | |
|---|---|---|
| PATENT NO. | : 9,217,661 B2 | Page 1 of 1 |
| APPLICATION NO. | : 13/969380 | |
| DATED | : December 22, 2015 | |
| INVENTOR(S) | : Nickolas Martin Clark | |

It is certified that error appears in the above-identified patent and that said Letters Patent is hereby corrected as shown below:

Title Page, item (54) and in the Specification, Column 1, line 1, delete "WEIGHTING" and insert --WEIGHING--.

Signed and Sealed this
Twenty-ninth Day of March, 2016

Michelle K. Lee
*Director of the United States Patent and Trademark Office*